(12) United States Patent
Bowman

(10) Patent No.: US 7,310,052 B2
(45) Date of Patent: Dec. 18, 2007

(54) WIRELESS METER-READING SYSTEM AND METHODS THEREOF

(76) Inventor: Eric L. Bowman, 270 E. Horizon Dr., Suite 109, Henderson, NV (US) 89105

( * ) Notice: Subject to any disclaimer, the term of this patent is extended or adjusted under 35 U.S.C. 154(b) by 180 days.

(21) Appl. No.: 11/175,927

(22) Filed: Jul. 6, 2005

(65) Prior Publication Data

US 2007/0008171 A1    Jan. 11, 2007

(51) Int. Cl.
*G08D 23/00* (2006.01)
(52) U.S. Cl. .......................... 340/870.02; 340/870.03; 340/870.05; 340/531; 370/401; 382/100
(58) Field of Classification Search .......... 340/870.02, 340/870.03, 870.05, 531; 370/401; 382/100
See application file for complete search history.

(56) References Cited

U.S. PATENT DOCUMENTS

| | | | |
|---|---|---|---|
| 3,961,316 A | | 6/1976 | Myer |
| 4,151,371 A | | 4/1979 | Yoshihara et al. |
| 4,680,704 A | * | 7/1987 | Konicek et al. ............ 382/100 |
| 4,811,011 A | * | 3/1989 | Sollinger ............... 340/870.02 |
| 5,870,140 A | | 2/1999 | Gillberry |
| 6,049,791 A | | 4/2000 | Lerner |
| 6,208,266 B1 | | 3/2001 | Lyons et al. |
| 6,657,552 B2 | | 12/2003 | Belski et al. |
| 6,798,352 B2 | | 9/2004 | Holowick |
| 6,900,738 B2 | * | 5/2005 | Crichlow ............... 340/870.02 |
| 6,956,500 B1 | * | 10/2005 | Ducharme et al. ..... 340/870.02 |
| 7,046,682 B2 | * | 5/2006 | Carpenter et al. ........... 370/401 |
| 7,049,975 B2 | * | 5/2006 | Vanderah et al. ...... 340/870.02 |
| 7,049,976 B2 | * | 5/2006 | Hunt et al. ............ 340/870.02 |
| 7,068,184 B2 | * | 6/2006 | Yee et al. ............. 340/870.05 |
| 7,098,783 B2 | * | 8/2006 | Crichlow .................... 340/531 |
| 2005/0012639 A1 | * | 1/2005 | Smit ..................... 340/870.02 |

* cited by examiner

*Primary Examiner*—Albert K. Wong
(74) *Attorney, Agent, or Firm*—Jeffrey D. Moy; Weiss & Moy, P.C.

(57) ABSTRACT

A wireless meter-reading system includes a utility meter having a housing and a face and a recording device located in the housing. The recording device is adapted to read and convert data located on a portion of the face to wirelessly transmittable data. A power source coupled to the recording device permits continuous and instantaneous capture of the wirelessly transmittable data from the face of the utility meter by the recording device. A communication device provided for wirelessly receiving and transmitting data between a consumer site and a utility provider site facilitates monitoring of the face of the utility meter by the consumer site and by the utility provider site. A method for allowing a consumer to join a secured wireless network of a utility provider comprises the consumer paying a fee to the utility provider. Both the consumer and the utility provider benefit from this arrangement.

20 Claims, 5 Drawing Sheets

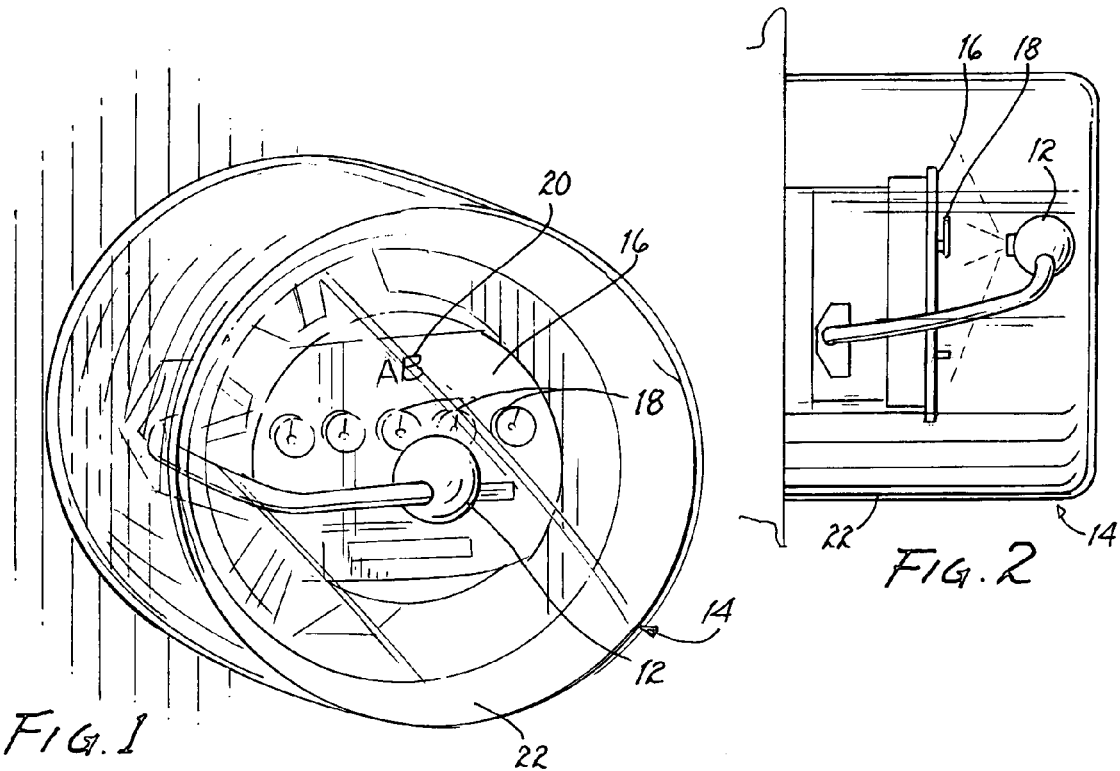
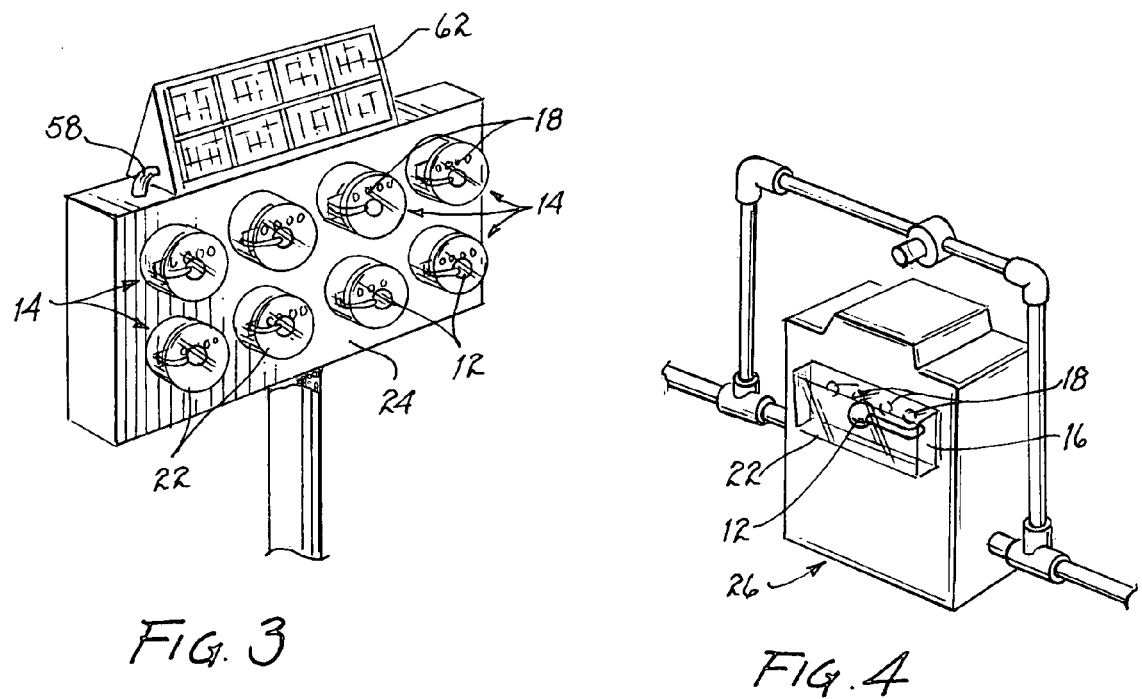

WEB CAMERA

WIRELESS METER-READING SYSTEM AND METHODS THEREOF

FIELD OF THE INVENTION

This invention relates generally to meter-reading devices and, more specifically, to an improved wireless meter-reading system, and methods to permit at least one consumer to join a utility provider secured network to display utility usage information instantaneously to the at least one consumer.

BACKGROUND OF THE INVENTION

In the past utility companies depended on employees to inspect the utility meters of their customers visually to determine utility usage. Over 58,000 meter-reading employees work for utility companies and branches of the government in the United States. Meter reading cost the utility provider industry over $1.5 billion every year just in labor alone.

More recently, utility companies have sought out to perform automated meter reading in hopes of improving accuracy and reducing expenses. Recent studies have found that an automated meter reading system could save a utility provider up to $25 per meter every year. This adds up to millions of dollars saved even for companies serving only small metropolitan areas.

Although numerous automated systems have been disclosed, none of these offers both the accuracy and savings fully intended by the disclosers of these automated systems. For example, Myer, U.S. Pat. No. 3,961,316 disclosed a mechanically actuated magnetocrystalline counter enclosed in a utility meter, with the capability of having the magnetically counted utility usage data transmitted remotely. Yoshihara et al., U.S. Pat. No. 4,151,371 disclosed a remote meter reading apparatus comprising interphone means. Gillberry, U.S. Pat. No. 5,870,140 disclosed a system for remote viewing and reporting, wherein a remote camera views a meter and transmits the scanned image to a central computer. These automated systems are all hard-wired systems. More recently, Belski et al., U.S. Pat. No. 6,657,552 disclosed a wireless system for communicating and control of automated meter reading, which depends on a sensor to read utility usage. Several other more recent disclosures also propose various wireless schemes for transmitting utility usage data, but none of these disclosures transmit optical data, such as a visual image of a utility meter. Additionally, these automated systems still require significant manual labor in the recording of meter readings, and are still prone to human error.

Another consideration is that American consumers have previously relied upon their utility providers to provide accurate billing. Following the rate increases that took place in recent years, these same consumers are now questioning the accuracy of their billings. American consumers prefer to be able to see their own meters rather than being told what the meter allegedly used.

For the foregoing reasons, given the limitations of the above-mentioned disclosures, an improved wireless meter-reading system is desirable.

SUMMARY OF THE INVENTION

In its simplest embodiment the wireless meter-reading system is at least one meter having a housing, with an recording device located in the housing of the at least one meter. The recording device is preferably capable of capturing multiple images of a face of the meter having usage data and unique identifying data pertaining to the meter. The recording device (or a module located in the housing of the meter) is adapted to transmit the captured images wirelessly to at least one of a satellite, a cell phone network and a combination router/cable. The captured images are relayed to a secure network hub wirelessly. The captured images are then relayed to both at least one consumer and at least one utility provider, where the visual images of the meter are viewed. According to the disclosure the improved wireless meter-reading system enables all parties with an interest in the utility usage to obtain real-time information. This provides a utility provider with an opportunity to create a new profit center by requesting that a consumer using this wireless automated system to pay a fee to access the automated wireless meter-reading system. The consumer benefits from this arrangement by being able to observe the meter and optimize utility usage. The utility provider benefits by reducing employee costs, knowing when the meter is malfunctioning and optimizing future utility usage needs by observing consumption of the utility, and providing feedback to the consumer about peak usage and how the consumer may be able to reduce utility usage costs.

Accordingly, it is an object of this disclosure to provide an improved wireless meter-reading system.

It is a further object of this disclosure to provide an improved wireless meter-reading system having a wireless meter-reading device located in a housing of a utility meter.

It is yet a further object of this disclosure to provide an improved wireless meter-reading system having a wireless meter-reading device powered by at least one solar-powered energy source.

It is still a further object of this disclosure to provide an improved wireless meter-reading system having a wireless meter-reading device adapted to display utility usage information securely to both at least one utility provider site and at least one consumer site.

It is yet a further object of this disclosure to provide an improved wireless meter-reading system having a wireless meter-reading device adapted to transmit e-mail messages wirelessly between at least one utility provider site and at least one consumer site.

It is a further object of this disclosure to provide a method for transmitting utility meter information wirelessly between at least one consumer site and at least one utility provider site.

It is still a further object of this disclosure to provide a method to permit at least one consumer to join a utility provider secured network, thereby facilitating the display of utility usage information instantaneously to the at least one consumer.

PREFERRED EMBODIMENTS OF THE INVENTION

In accordance with one embodiment of this invention, a wireless meter-reading system is disclosed. The system having at least one consumer site and at least one utility provider site, comprises in combination (a) at least one utility meter having a housing and a face; (b) at least one recording device coupled to the housing, the at least one recording device adapted to read and convert data located on a portion of the face to wirelessly transmittable data; (c) a power source coupled to the recording device for powering the at least one recording device; and (d) a communication device for wirelessly receiving and transmitting data between the at least one consumer site and the at least one utility provider site to facilitate monitoring of the face of the at least one utility meter by the at least one consumer site and by the at least one utility provider site.

In accordance with a second embodiment of this invention, a method for allowing at least one consumer to join a secured wireless network of at least one utility provider is disclosed. The method comprises the step of (a) providing at least one utility meter having a housing and a face. The method further comprises the step of (b) providing at least one recording device, the at least one recording device in the housing adapted to read and convert data located on a portion of the face to wirelessly transmittable data. The method further comprises the step of (c) providing a power source coupled to the at least one recording device. The method further comprises the step of (d) providing a communication device provided for wirelessly receiving and transmitting data between the at least one consumer and the at least one utility provider, thereby facilitating monitoring of the face of the at least one utility meter by the at least one consumer and by the at least one utility provider. The method further comprises the step of (e) providing a secured network hub by the at least one utility provider to relay data from the at least one utility provider to the at least one consumer. The method further comprises the step of paying a fee by the at least one consumer to the at least one utility provider allowing the at least one consumer to join the secured wireless network of the at least one utility provider, and thereby instantaneously receive at least utility usage data and current billing data of the at least one consumer from the secured wireless network comprising a combination of the at least one recording device located in the at least one utility meter, the power source coupled to the at least one recording device, the communication device, and a network hub secured by the at least one utility provider.

In accordance with a third embodiment of this invention, a wireless meter-reading system is disclosed. The system having at least one consumer site and at least one utility provider site, comprises in combination (a) at least one utility meter having a housing and a face; (b) at least one recording device coupled to the housing, the at least one recording device adapted to read and convert data located on a portion of the face to wirelessly transmittable data; (c) a power source coupled to the recording device for powering the at least one recording device; and (d) a communication device for wirelessly receiving and transmitting data between the at least one consumer site and the at least one utility provider site to facilitate instantaneous and continuous monitoring of the face of the at least one utility meter by the at least one consumer site and by the at least one utility provider site.

The foregoing and other articles, features, and advantages of the invention will be apparent from the following more detailed description of the preferred embodiments of the invention, as illustrated in the accompanying drawings.

BRIEF DESCRIPTION OF THE DRAWINGS

FIG. 1 is a perspective view of a portion of a wireless meter-reading system according to the present invention.

FIG. 2 is a perspective view of a portion of the wireless-meter reading system of FIG. 1 showing a side view of the recording device.

FIG. 3 is a perspective view of a second embodiment of the wireless meter-reading system.

FIG. 4 is a perspective view of a portion of a third embodiment of the wireless meter-reading system.

DESCRIPTION OF THE INVENTION

Figure 5:
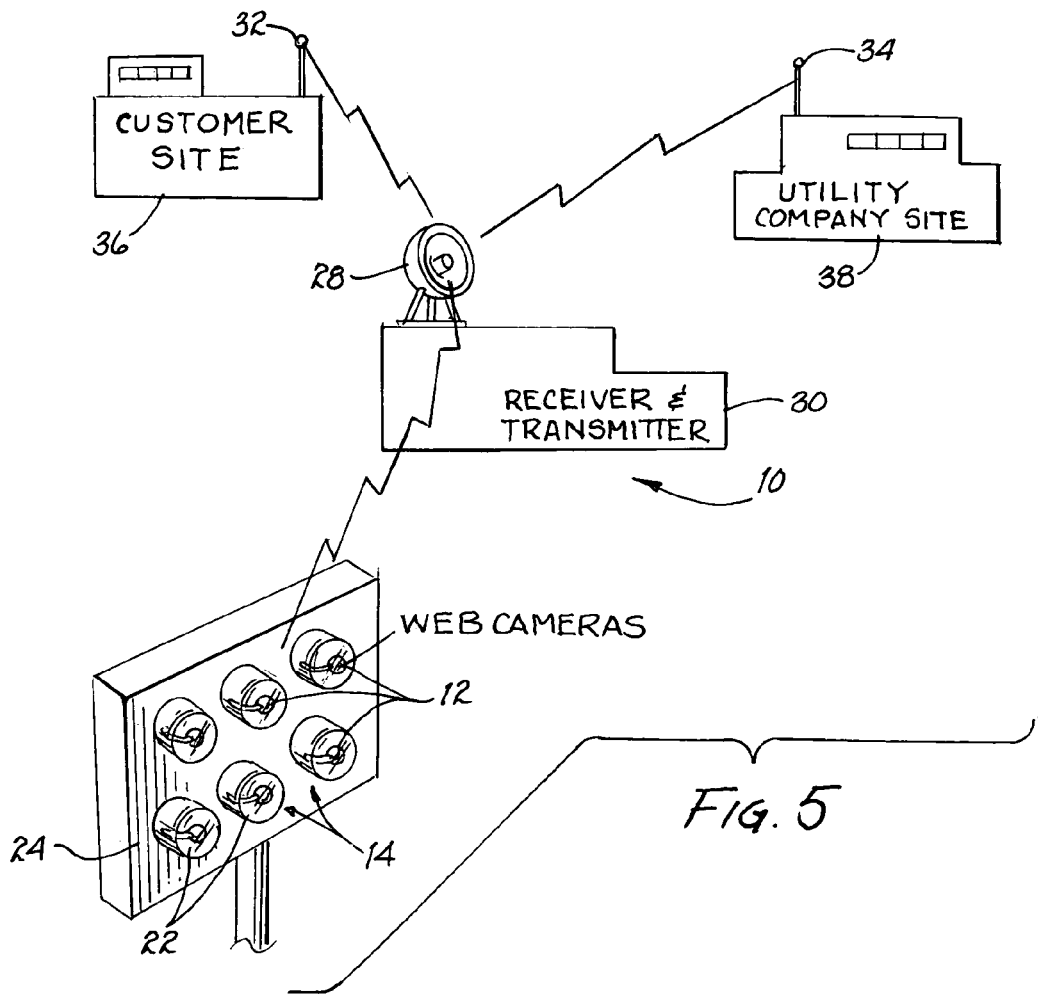
FIG. 5 is a schematic diagram of a portion of the second embodiment of the wireless meter-reading system of FIG. 3.

In this application, the term "consumer site" is interchangeable with the term "customer site", and the term "utility company site" is interchangeable with the term "utility provider site". Furthermore, in this application, the terms "customer" and "consumer" are interchangeable, as are the terms "utility company" and "utility provider". The term "network hub" is interchangeable with either one of the terms "internet network" and "intranet network".

According to FIG. 1, a portion of a wireless meter-reading system 10 comprises at least one utility meter 14 (shown in FIG. 1 as an electric utility meter 14) having a housing 22 and including a face 16. The housing 22 preferably comprises a substantially transparent durable polymer. The face 16 of the at least one utility meter 14 comprises at least utility usage data 18 (shown in FIG. 1 as a plurality of numeric dials 18) of the at least one utility meter 14. The movement of each one of the plurality of dials 18 indicates (counts) utility usage. The face 16 of the utility meter 14 displays identifying data 20. The identifying data 10 uniquely identifies each utility meter 14 that corresponds to each customer (or consumer) site 36 (see FIGS. 5, 7, 8, 10 and 11). A portion of the wireless meter-reading system 10 further comprises at least one recording device 12.

The recording device 12 is adapted to read and convert the data (the utility usage data 18 and the identifying data 20) located on a portion of the face 16 to wirelessly transmittable data. Conversion methods include various compression schemes for transmitting digital data more easily, including Joint Photographic Experts Group ("jpeg") formats and the like. The recording device 12 is located in the housing 22 of the utility meter 14. The recording device 12 may be at least one of a digital camera, a web camera, an electronic eye, a laser, a digitally counting electronic chip, a scanner, a bar code reader or the like. The listing of the above is not to be construed as a limitation of the scope of the present disclosure. Preferably, the recording device 12 comprises a charge-coupled device (CCD) sensor having at least about 0.03 mega-pixel resolution and the recording device 12 captures visual images through a small fixed lens. The recording device 12 converts the visual images to electric pulses and either temporarily saves these electric pulse images in on-board memory within the at least one recording device 12 for subsequent wireless transmission, or immediately transmits these electric pulse images wirelessly. Preferably, each one of the electric pulse images has at least a resolution of 160×120 pixels. The recording device 12 may be a still digital camera or a digital camera capable of continuous operation such as a digital movie camera operating at a speed of at least 15 frames per second. An aperture of the lens of the recording device 12 has both auto-focus and auto light settings, thereby taking into account prevailing environmental conditions. If the recording device 12 is a digital camera, a digital shutter of the recording device 12 controls the operation of the recording device 12.

A portion of the wireless meter-reading system 10 may further comprise the utility meter 14 having an alarm (shown as a portion of the recording device 12 coupled to the housing 22) adapted to alert the utility provider (or utility company) site 38 (see FIGS. 5, 6, 8, 9, 10 and 11) when the utility meter 14 is inoperable and requires repair. A portion of the wireless meter-reading system 10 may further comprise a light source (not shown) located in the housing 22 of the utility meter 12. The light source may be activated under low light conditions where the auto light setting may be inadequate, thereby facilitating optical capture of wirelessly transmittable data (utility usage data 18 and identifying data 20 converted into electronic form) from the face 16 of the utility meter 12.

The housing 22 of the utility meter 14 may further have at least one wireless transfer module located in the housing 22. Alternatively, the recording device 12 may comprise the wireless transfer module (not shown). Well-known wireless technologies having wireless transfer modules include UWB, 802.11g, 802.11a, 802.11b, WLAN, Wi-Fi®, AirPort, Infrared, Bluetooth ® and ZIGBEE™, and the like. However, wireless technology is a rapidly developing technical field and the above listing of wireless technologies should not be construed as a limitation of the current disclosure. With the wireless transfer module (described above), e-mail may be sent wirelessly to a secure (intranet or internet) network hub 56 (not shown in FIG. 1, but shown in FIG. 11, described below) by a communication device 30 provided for wirelessly receiving and transmitting data (see FIGS. 5, 8, 9 and 10, described below). The secure network hub 56 is controlled by the at least one utility company (or provider) site 38, and e-mail may be distributed to both the customer (or consumer) site 36 and the utility company (or utility provider) site 38. The secured network hub 56 comprises a server (not shown) of a central processing unit (not shown in FIG. 1) preferably controlled by the utility provider site 38. The server of the secured network hub 56 wirelessly relays data to at least one local CPU 40 having an antenna 34 located at the at least one utility company site 38 (see FIG. 6). The server of the secured network hub 56 also wirelessly relays data to at least one local central processing unit (CPU) 40 having an antenna 32 located at the at least one customer site 36 (see FIG. 7).

The communication device 30 comprises a combination of a router/modem (depicted as a portion of a block diagram). An antenna 28 of the communication device 30 for wirelessly receiving and transmitting, see FIGS. 5, 8, 9 and 10) couples the combination of the router/modem wirelessly to both the recording device 12 and to the secured network hub 56. The secured network hub 56 relays visual images of the face 16 of the utility meter 14 from the recording device 12 to the customer (or consumer site) 36 and to the one utility company (or utility provider) site 38. The secured network hub 56 facilitates e-mail transmissions between the utility company (or utility provider) site 38 and the customer (or consumer site) 36. Alternatively, the communication device 30 may be at least one of a satellite (depicted as a portion of a block diagram denoted "receiver and transmitter") and a cell phone network (depicted as a portion of a block diagram denoted "receiver and transmitter"), and the like. The communication device 30 is wirelessly coupled to the recording device 12 (such as a wireless cell phone). It is understood that when the communication device 30 is coupled to a wireless cell phone, the wireless cell phone further comprises at least a recording device 12 such as a digital camera, and the like. The wireless cell phone may be programmed to respond to transmissions from both the customer site 36 and the utility company site 38. Each one of the satellite and the cell phone network is adapted to relay data from the recording device 12 located in the housing 22 of the utility meter 14 to the consumer site 36 and to the utility provider site 38.

Referring to FIG. 2, a side view of a portion of the wireless meter-reading system 10 includes the recording device 12 positioned in the housing 22 of the electric utility meter 14 of FIG. 1. The recording device 12 is adapted to read the face 16, having the utility usage data 18 and the identifying data 20 (not shown in FIG. 2), located thereon of the electric utility meter 14.

Referring now to FIG. 3, a second embodiment of the wireless meter-reading system 10 shows a plurality of electric utility meters 14 located on a panel 24. The second embodiment of the wireless meter-reading device 10 is particularly applicable in an apartment or a condominium complex, but may also be useful in a housing complex where it is highly desirable to optimize energy usage. A power source is provided for powering the at least one recording device 12. In FIG. 3 the power source comprises a solar panel 62. The solar panel 62 is coupled to the panel 24. A cable 58 having a multiplicity of lines couples the solar panel 62 to the recording device 12 (depicted in FIG. 1), located in a housing 22 of each electric utility meter 14 of the plurality of electric utility meters 14. The second embodiment of FIG. 3 herein is particularly suitable in climates where there are many days of sunshine. It is understood without limitation that the power source may comprise at least one of a battery, a solar power panel, a wind turbine, a portion of power supplied to the utility meter 14, and the like.

Referring to FIG. 4, a portion of a third embodiment of the wireless meter-reading system shows a front side of a gas utility meter 26. The gas utility meter 26 has a face 16 located on the gas utility meter 26, with at least one recording device 12 (similar to the recording device 12 of FIG. 1) located in a housing 22 of the gas utility meter 26. It is understood that without limitation the utility meter 12 may comprise at least one of an electric meter, a gas meter, a water meter, and the like.

Referring now to FIG. 5, a schematic diagram of a portion of the second embodiment of the wireless meter-reading system 10 of FIG. 3 (without the at least one solar panel 62) shows the plurality of electric utility meters 14. Each one of the plurality of electric utility meters 14 has the at least one recording device 12 (depicted in FIG. 1) denoted as a "web camera" 12 located in the housing 22 of each one of the electric utility meters 14. The at least one recording device 12 of each of the plurality of utility meters 14 is adapted to communicate wirelessly with the remote antenna 28 of the communication device 30 (shown as a block diagram denoted "receiver and transmitter" 30). The communication device 30 facilitates wireless relay of information between the remote antenna 28 and each of an antenna 32 of the customer (or consumer) site 36 and an antenna 34 of the utility company (or utility provider) site 38 (each shown as a block diagram).

Figure 6:
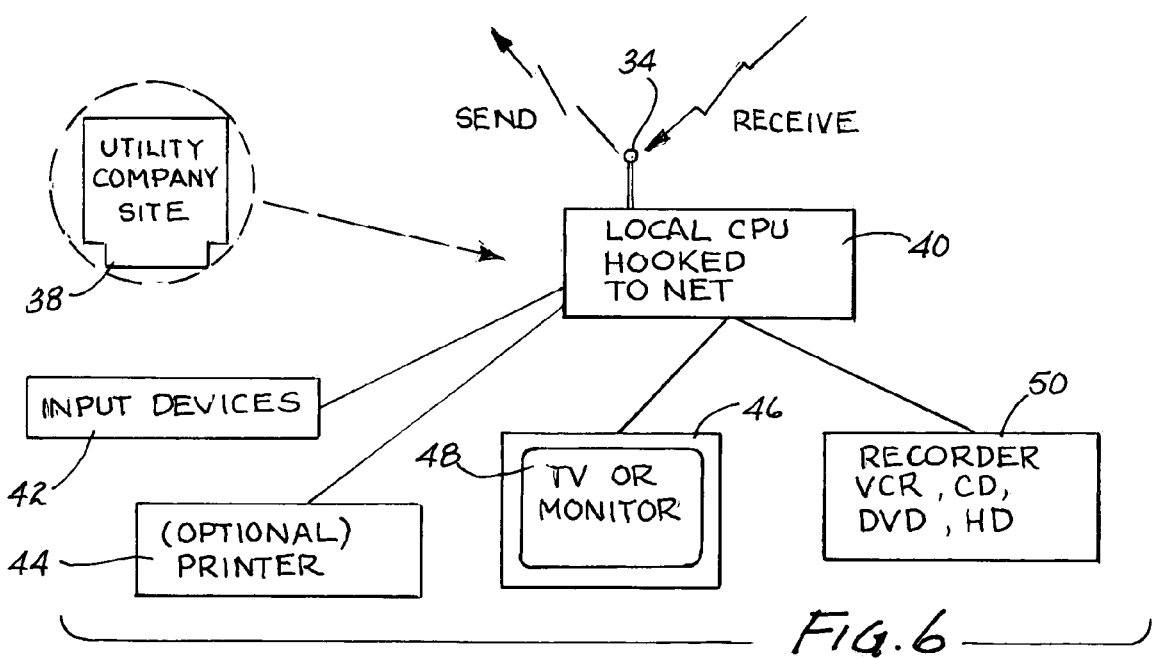
FIG. 6 is a schematic diagram showing a feature of a portion of a wireless meter-reading system of a utility company site.

According to FIG. 6, a schematic diagram shows a feature of a portion of the wireless meter-reading system 10 of the utility company (utility provider) site 38. The utility company site 38 comprises at least one local central processing unit (CPU) 40 coupled to the server (not shown in FIG. 11, described below) of the secured network hub 56 (not shown in FIG. 6, but shown in FIG. 11, described below). The local CPU 40 of the utility company site 38 has at least one input device 42 and at least one output device including a printer 44, a monitor (or TV) 46 and a recorder device 50 (denoted "recorder" 50). The input device 42 comprises at least one of a mouse, a keyboard and an electronic writing pad, and the like. The input device 42 permits a user of the utility company site 38 to input data to be transmitted via the communication device 30 to the customer site 36. The input device 42 also permits the user of the utility company site 38 to input data wirelessly to the recording device 12 located in the housing 22 of the utility meter 14 of the customer site 36. The recorder device 50 is selected from the group consisting of a videocassette recorder, a compact disk recorder, a digital videodisk recorder, a floppy disk and a hard disk, and the like. The local CPU 40 both sends and receives data wirelessly from the antenna 34 of the local CPU 40 to the remote antenna 28 (not shown in FIG. 6) of the communication device 30.

Figure 7:
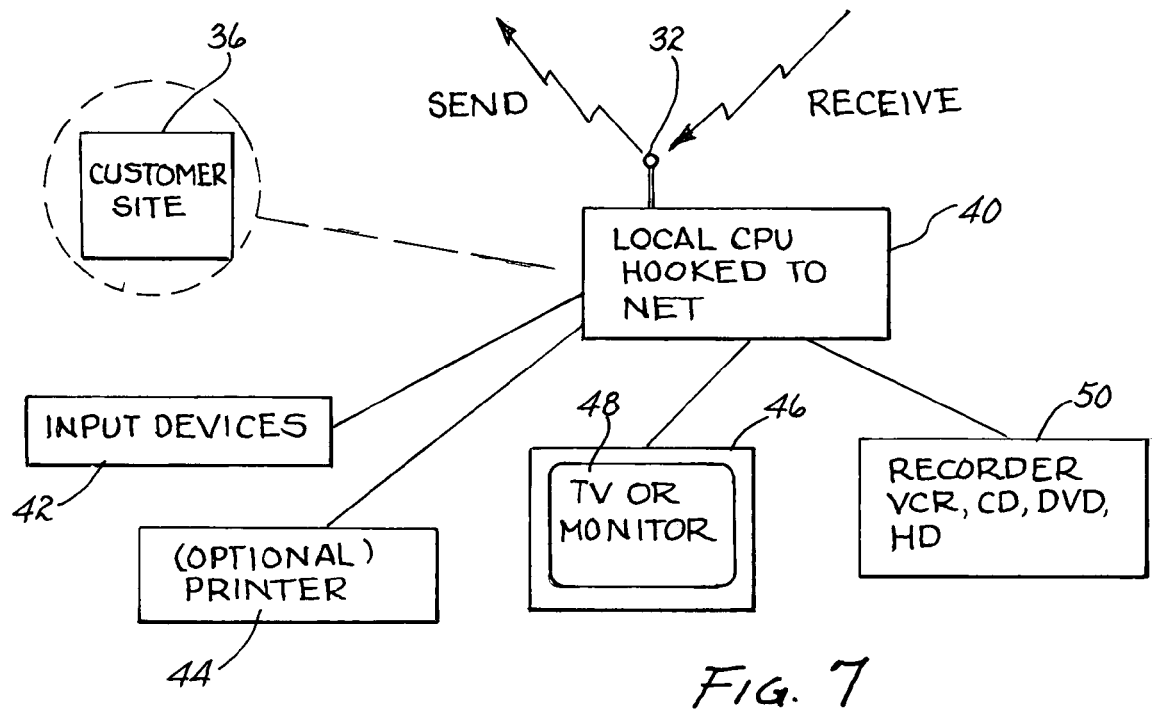
FIG. 7 is a schematic diagram showing a second feature of a portion of a wireless meter-reading system of a customer site.

Referring to FIG. 7, a schematic diagram shows a second feature of a portion of the wireless meter-reading system 10 of the customer (consumer) site 36. The customer site 36 comprises at least one local central processing unit (CPU) 40 of the customer site 36 coupled to the server (not shown in FIG. 11, described below) of the secured network hub 56 (not shown in FIG. 7, but shown in FIG. 11, described below). The one local CPU 40 of the customer site 36 has at least one input device 42 and at least one output device including a printer 44, a monitor (or TV) 46 and a recorder device 50 (denoted recorder 50). The input device 42 comprises at least one of a mouse, a keyboard and an electronic writing pad, and the like. The input device 42 permits a user of the customer site 36 to input data to be transmitted via the communication device 30 to the utility company site 38. The input device 42 permits the user of the customer site 36 to input data to be transmitted wirelessly to the recording device 12 located in the housing 22 of the utility meter 14 of the customer site 36. The recorder device 50 is selected from the group consisting of a videocassette recorder, a compact disk recorder, a digital videodisk recorder, a floppy disk and a hard disk, and the like. The local CPU 40 of the customer site 36 both sends and receives data wirelessly from the antenna 32 of the local CPU 40 of the customer site 36 to the remote antenna 28 (not shown in FIG. 7) of the communication device 30.

Figure 8:
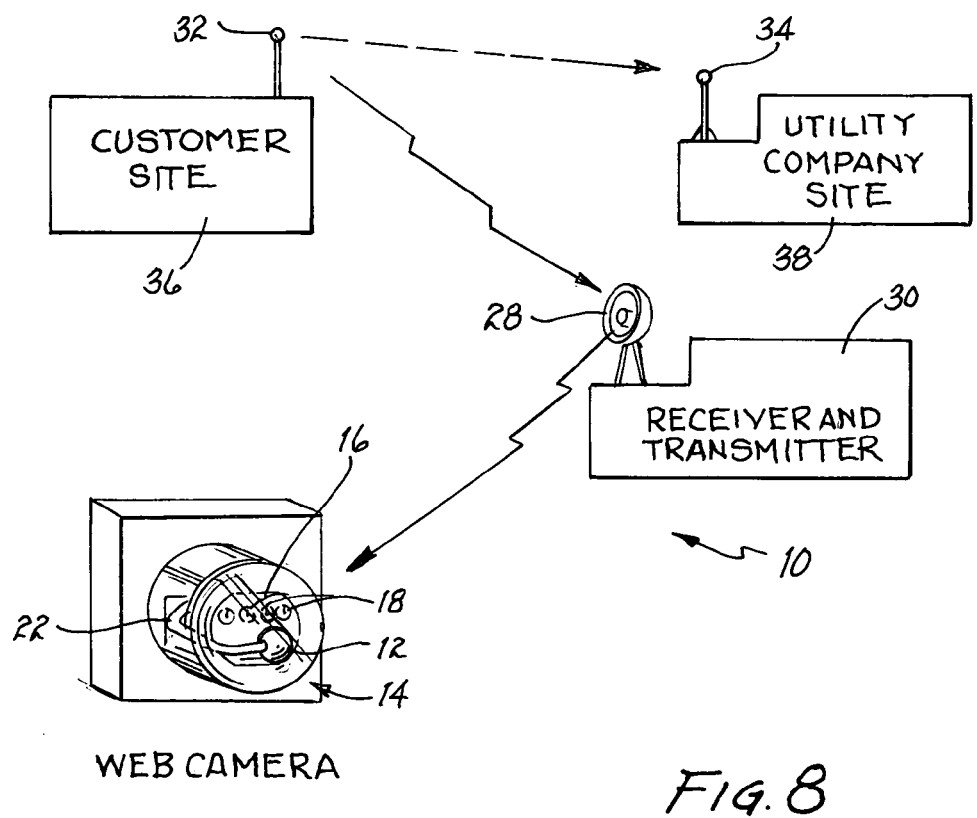
FIG. 8 is a schematic diagram of a fourth embodiment of a portion of the wireless meter-reading system

Referring now to FIG. 8, a schematic diagram of a fourth embodiment of a portion of the wireless meter-reading system 10 shows one utility meter 12 having the recording device 12 (denoted as a "web camera" 12). The recording device 12 is adapted to wirelessly relay data (as described above) to the antenna 28 of the communication device 30 (shown as a block diagram "receiver and transmitter" 30). The communication device 30 facilitates data transmission between both of the antenna 32 of the customer site 36 (shown as a block diagram) and the antenna 34 of the utility company site 38 (shown as a block diagram). It is understood that wireless transmission may occur between the antenna 32 of the customer site 36 and the antenna 34 of the utility company site 38 through the secured network hub 56 (not shown in FIG. 8, but shown in FIG. 11, described below).

Figure 9:
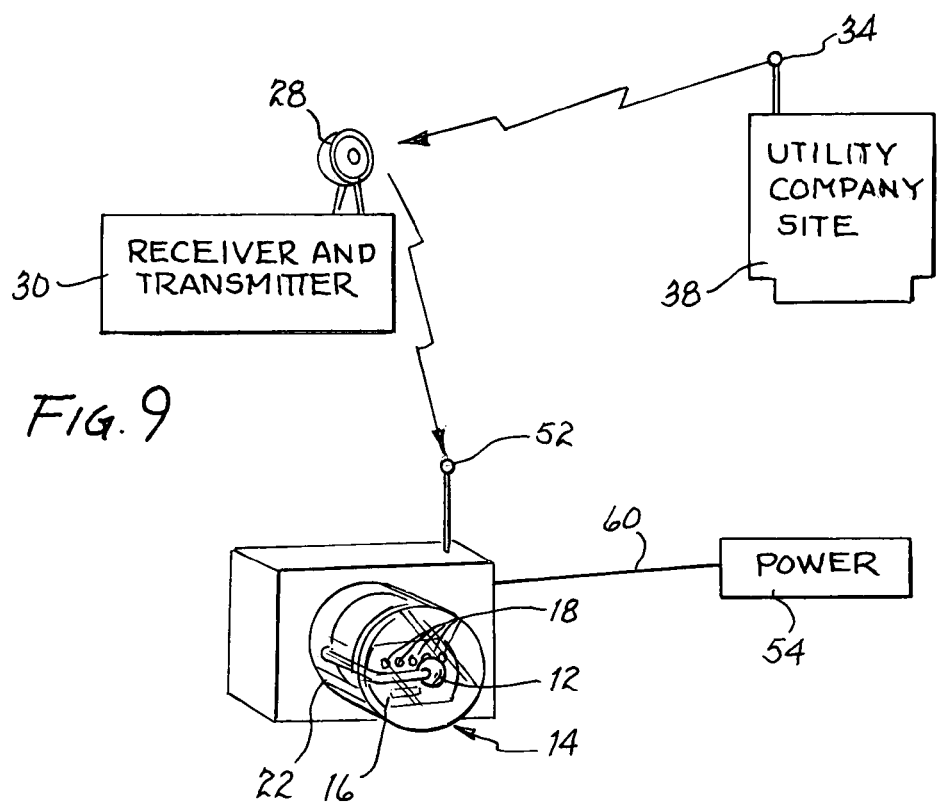
FIG. 9 is a schematic diagram of a portion of a fifth embodiment of the wireless meter-reading system.

Referring to FIG. 9, a schematic diagram of a portion of a fifth embodiment of the wireless meter-reading system 10 shows the utility meter 14 (shown as the electric utility meter 14) of the customer site 36. The utility meter 14 has the recording device 12 located in the housing 22 of the at least one utility meter 14. A line 60 couples the recording device 12 to a power supply 54 (shown as a block diagram denoted "power" 54). The power supply 54 is adapted to provide continuous power to the recording device 12. A portion of the housing 22 of the utility meter 14 comprises an antenna 52 for wirelessly relaying data to the antenna 28 of the communication device 30 (shown as a block diagram denoted "receiver and transmitter" 30). Alternatively, the antenna 52 may be a portion of the wireless transfer module located in a portion of the housing 22 of the electric utility meter 14 or a portion of the at least one recorder 12. The antenna 28 of the communication device 30, relays data both to and from the utility company site 38.

Figure 10:
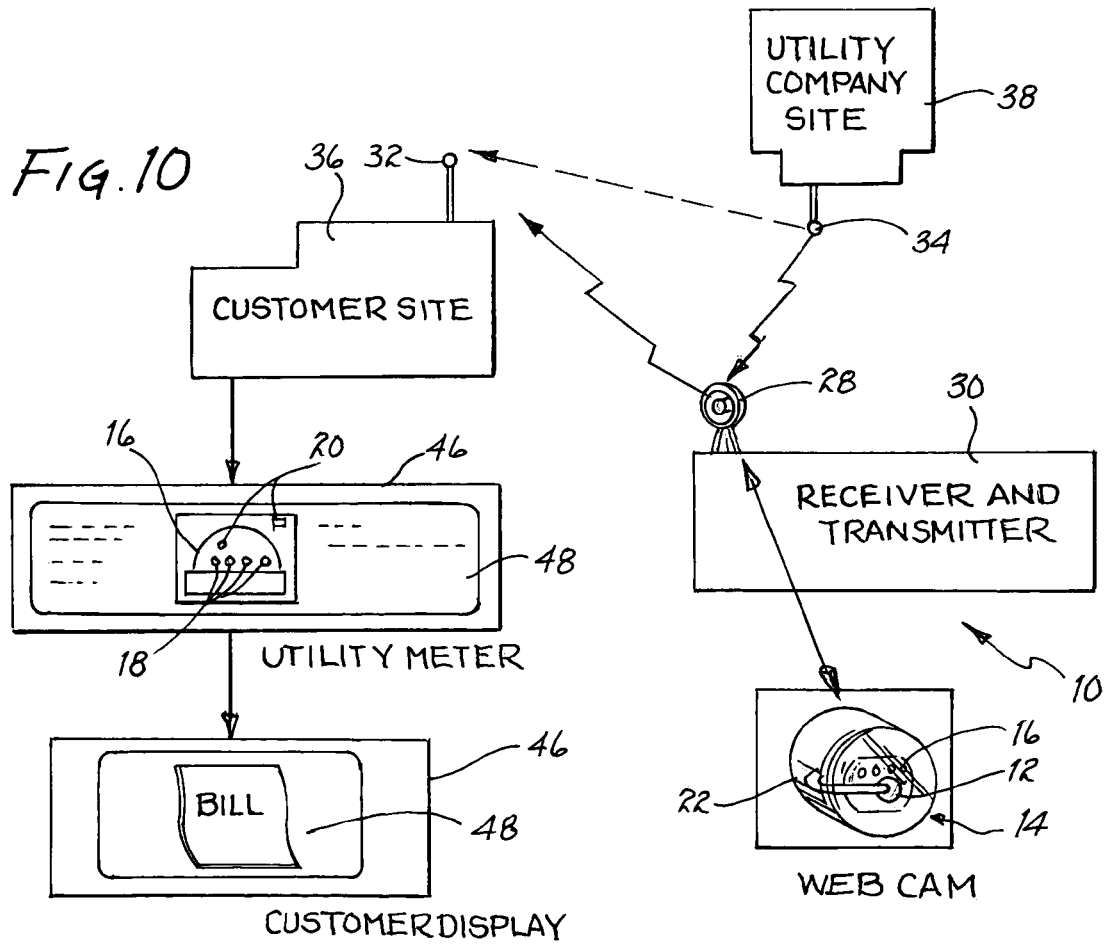
FIG. 10 is a schematic diagram of another feature of a portion of the fourth embodiment of the wireless meter-reading system of FIG. 8 showing a screen display of a customer monitor, as well as showing an alternative screen display of the customer monitor.

Turning now to FIG. 10, a schematic diagram of another feature of a portion of the fourth embodiment of the wireless meter-reading system 10 (see FIG. 8 also) shows the utility meter 14 (shown in FIG. 10 as an electric utility meter 14) has the recording device 12 denoted "web camera". A remote antenna 28 of the communication device 30 (shown as a block diagram denoted "receiver and transmitter") couples wirelessly to the antenna 32 of the customer site 36 and to the antenna 34 of the utility company site 38 (each shown as a block diagram). Furthermore, a portion of a screen 48 of the monitor 46 of the customer site 36 includes at least one image of a portion of the face 16 of the utility meter 14 located at the customer site 36. Additionally, other information transmitted to the customer site 36 by the utility company site 38 may be shown on a portion of the screen 48 together with the at least one image of the face 16 of the utility meter 14. For example, other information may include at least one of a log on user name and password request, a log off request, a message from the utility company 38 indicating better strategies for decreasing utility usage costs, and the utility usage data (currently shown as the plurality of dials 18, see description above) shown as numeric data, and the like. An alternative portion of the screen 48 of the monitor 46 of the customer site 36 may include a billing statement transmitted to the customer site 36 from the utility company site 38. It is understood that a portion of a screen 48 of the monitor 46 of the utility company site 38 may also comprise an image of the face 16 of the utility meter 14 of the customer site 36, together with other information (not shown in FIG. 10). It is further understood that the utility company site 38 may be wirelessly coupled directly to the customer site 36, preferably through the secured network hub 56 (not shown in FIG. 10, but shown in FIG. 11, described below).

Figure 11:
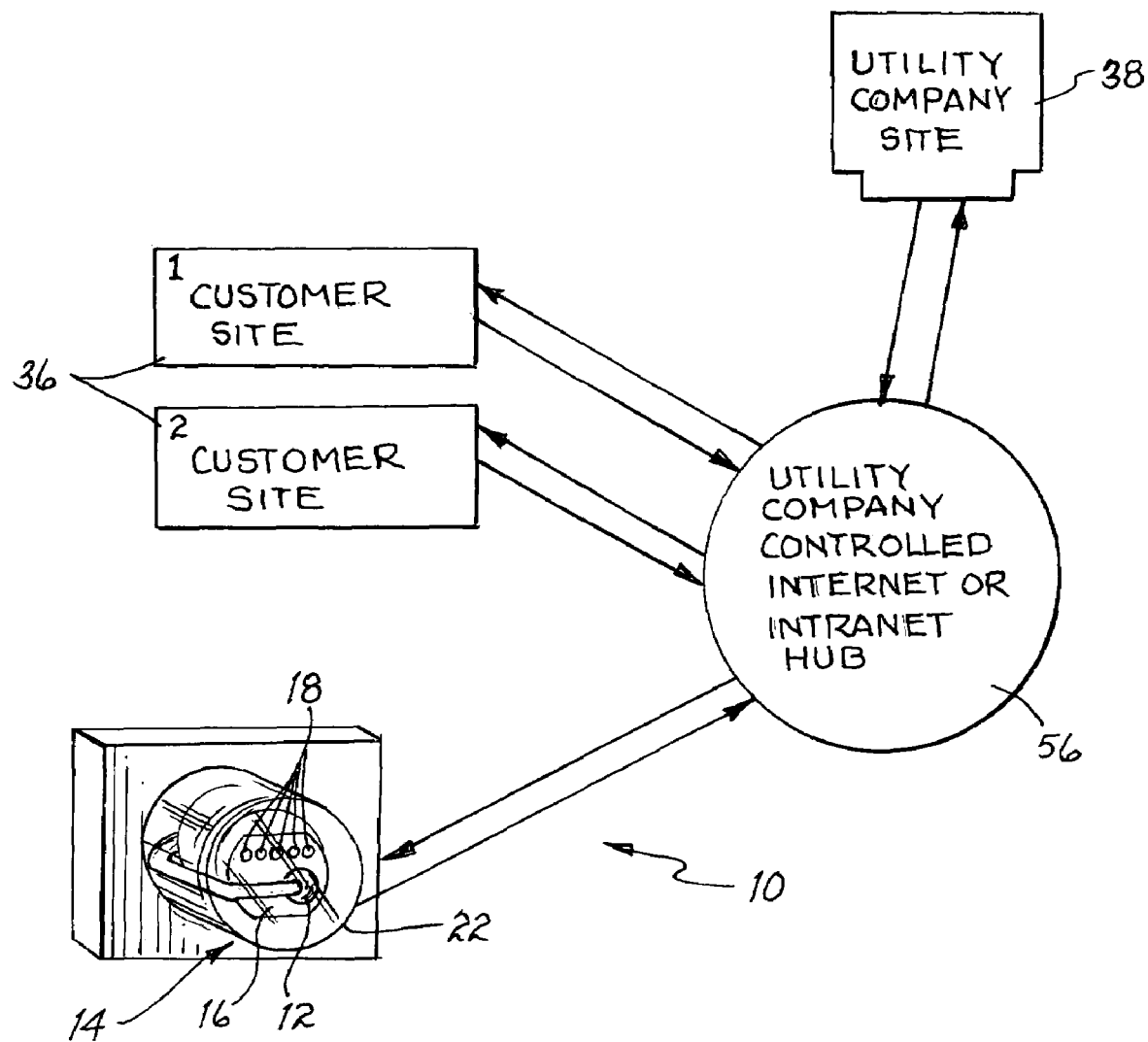
FIG. 11 is a schematic diagram of a portion of a sixth embodiment of the wireless meter-reading system showing at least one of an intranet utility company hub and an internet utility company hub with each one of at least one customer site coupled wirelessly to the utility company site through the at least one of the internet utility company hub and the intranet utility company hub.

Referring to FIG. 11, a schematic diagram of a portion of a sixth embodiment of the wireless meter-reading system 10 shows the utility meter 14 (FIG. 11 shows the electric utility meter 14) having recording device 12 located in the housing 22 of the utility meter 14. The recording device 12 is coupled to the secured network hub 56 (at least one of an internet utility company hub and an intranet utility company hub in a block diagram denoted as "utility company controlled internet or intranet hub"). Each one of at least one customer site 36 (denoted as "1 customer site, 2 customer site" in block diagrams) is coupled wirelessly to the utility company site 38 through the secured network hub 56. The secured network hub 56 may comprise a server of a central processing unit programmed to wirelessly relay data from the utility meter 14 to both the one customer site 36 and the utility company site 38. Additionally, the server may be programmed to wirelessly relay data from the customer site 36 to the utility company site 38 directly. Additionally, the server may be programmed to wirelessly relay data from the utility company site 38 directly to the at least one customer site 36. It is understood that the secured network hub 56 may relay data through communication device 30 (not shown in FIG. 11, but described above and shown in FIGS. 5, 8, 9 and 10). A user of the customer site 36 may join the secured network hub 56 of the utility company site 38 by paying a set-up fee. The at least one utility company site 38 may also request maintenance fees from the user of the customer site 36 to continue usage of the secured network hub 56. The fees described above may be an extra income stream for the utility company site 38, while providing enhanced services for the customer site 36.

Exemplary Method for Allowing at Least One Consumer to Join a Secured Wireless Network of at Least One Utility Provider Details of the individual components making up the secured wireless network are the same as described above.

A method for allowing at least one consumer to join a secured wireless network of at least one utility provider, comprises a number of steps. The method comprises the step of the utility provider providing a utility meter 14 having a housing 22 and the utility meter 14 including a face 16. The method further comprises the step of the utility provider providing at least one recording device 12. The recording device 12 is adapted to read and convert data located on a portion of the face 16 of the utility meter 14 to wirelessly transmittable data, and the recording device 12 is located in the housing 22 of the utility meter 14. Subsequently, the method comprises the step of providing a power source for powering the recording device 12, thereby permitting continuous and instantaneous capture of the wirelessly transmittable data from the face 16 of the utility meter 14 by the recording device 12. The method further comprises the steps of providing a communication device 30 provided for wirelessly receiving and transmitting data between the consumer and the utility provider, thereby facilitating instantaneous and continuous monitoring of the face 16 of the utility meter 14 by the consumer and by the utility provider. The method further comprises the step of the utility provider providing a secured network hub 56 adapted to relay data from the utility provider to the consumer. The method further comprises the step of the consumer paying a fee to the utility provider allowing the consumer to join the secured wireless network 56 of the utility provider, and thereby instantaneously receive at least utility usage data and current billing data of the consumer from the secured wireless network.

The method further comprises the step of displaying the utility usage data 18 and the identifying data 20 of the utility meter 14 on the screen 48 of the monitor 46 of the consumer and on the screen 48 of the monitor 46 of the utility provider. Furthermore, the method comprises the steps of the consumer determining excessive utility usage by monitoring the face 16 of the utility meter 14 of the consumer over the secure network hub 56. By implementing the previous steps, the consumer is enabled to reduce wasteful utility usage by the consumer, thereby conserving utility usage and reducing costs of the consumer.

The method further comprises the steps of the utility provider monitoring the face 16 of the utility meter 14 of each one of at least one consumer over the secure network hub 56 and the utility provider predicting future utility usage of each consumer. By implementing the previous steps, the utility provider is enabled to improve planning for utility expansion. The utility provider is further enabled to improve planning of peak usage times of the utility usage of each consumer to allocate costs of the utility usage to each consumer during peak usage times efficiently.

While the invention has been particularly shown and described with reference to preferred embodiments thereof, it will be understood by those skilled in the art that the foregoing and other changes in form and details may be made therein without departing from the spirit and scope of the invention. For example, instead of the recording device being housed in the utility meter, in an alternative embodiment, the recording device may be located out of the utility meter. An example of a recording device suitable for such use is a JCAM IP WEB CAMERA™ manufactured by J-Systems, Inc., IL, USA, which is a harsh environment solar powered wireless IP (Web) camera system. The JCAM IP WEB CAMERA™ is a remote security device, but may be adapted to be used as the recording device contemplated by this disclosure because the JCAM IP WEB CAMERA™ has sufficient resolution capability. Additionally, secure network hub capabilities may be contracted from an internet service provider (ISP) by the utility provider (utility company). Besides being an electric utility meter, a gas utility meter or a water utility meter, the utility meter may be any other meter used to gauge usage of a commodity.

What is claimed is:

1. A wireless meter-reading system having at least one consumer site and at least one utility provider site, comprising, in combination:
    (a) at least one utility meter having a housing and a face;
    (b) at least one recording device coupled to said housing, said at least one recording device adapted to read and convert data located on a portion of said face to wirelessly transmittable data, said at least one recoding device capturing visual images of the data located on a portion of said face;
    (c) a power source coupled to the recording device for powering said at least one recording device; and
    (d) a communication device for wirelessly receiving and transmitting data between said at least one consumer site and said at least one utility provider site to facilitate monitoring of said face of said at least one utility meter by said at least one consumer site and by said at least one utility provider site, said communication device relaying the visual images of said face of said at least one utility meter from said at least one recording device to said at least one consumer site, and said secured network hub facilitating e-mail transmission between said at least one utility provider site and said at least one consumer site, wherein said email transmission including a billing statement and visual images confirming said billing statement.

2. The system of claim 1 further comprising an alarm coupled to said at least one utility meter adapted to alert said at least one utility provider site when said at least one utility meter is inoperable and requires repair.

3. The system of claim 1 further comprising a light source located in said housing of said at least one utility meter, to enhance optical capture of said wirelessly transmittable data from said face of said at least one utility meter.

4. The system of claim 1, wherein said at least one utility meter comprises at least one of an electric meter, a gas meter, and a water meter.

5. The system of claim 1, wherein said at least one recording device comprises at least one digital camera, a web camera, an electronic eye, a laser, a digitally counting electronic chip, a scanner and a bar code reader.

6. The system of claim 1, wherein said face of said at least one utility meter comprises utility usage data and identifying data of said at least one utility meter from said at least one consumer site.

7. The system of claim 1, wherein said power source comprises at least one of a battery, a solar power panel, a wind turbine and a portion of power supplied to said at least one utility meter.

8. The system of claim 1, wherein said communication device is coupled wirelessly to both said at least one at least one recording device and to a secured network hub.

9. The system of claim 8, wherein said secured network hub comprises a server of a central processing unit of said at least one utility provider site.

10. The system of claim 1, wherein both said at least one consumer site and said at least one utility site have at least one input device and at least one output device.

11. A method for allowing at least once consumer to join a secured wireless network of at least one utility provider, comprising the steps of:
   (a) providing at least one utility meter having a housing and a face;
   (b) providing at least one recording device, said at least one recording device in said housing adapted to read and convert data located on a portion of said face to wirelessly transmittable data, said at least one recoding device capturing visual images of the data located on a portion of said face;
   (c) providing a power source coupled to said at least one recording device;
   (d) providing a communication device provided for wirelessly receiving and transmitting data between said at least one consumer and said at least one utility provider, thereby facilitating monitoring of said face of said at least one utility meter by said at least one consumer and by said at least one utility provider, said communication device relaying the visual images of said face of said at least one utility meter from said at least one recording device to said at least one consumer site, and said secured network hub facilitating data transmission between said at least one utility provider site and said at least one consumer site, wherein said data transmission including a billing statement and visual images confirming said billing statement; and
   (e) providing a secured network hub by said at least one utility provider to relay data from said at least one utility provider to said at least one consumer.

12. The method according to claim 11 further comprising the step of:
   paying a fee by said at least one consumer to said at least one utility provider allowing said at least one consumer to join said secured wireless network of said at least one utility provider, and thereby instantaneously receive at least utility usage data and current billing data of said at least one consumer from said secured wireless network comprising a combination of said at least one recording device located in said at least one utility meter, said power source coupled to said at least one recording device, said communication device, and a network hub secured by said at least one utility provider.

13. The method according to claim 11 further comprising the steps of:
   providing said at least one utility meter having an alarm to alert said at least one utility provider when said at least one utility meter is inoperable and requires repair by said at least one utility provider; and
   providing a light source located in said housing of said at least one utility meter, said light source activated under low light conditions to facilitate optical capture of data from said face of said at least one utility meter.

14. The method according to claim 11 further comprising the steps of:
   providing said at least one utility meter comprising at least one of an electric meter, a gas meter, and a water meter; and
   providing said at least one recording device comprising at least one recording device comprising at least one of a digital camera, a wed camera, an electronic eye, a laser, a digitally counting electronic chip, a scanner, and a bar code reader.

15. The method according to claim 11 further comprising the step of:
   providing said secured network hub comprises a server of a central processing unit of said at least one utility provider.

16. The method according to claim 11 further comprising the step of:
   providing both said at least one consumer and said at least one utility provider have at least one input device and at least one output device.

17. The method according to claim 11 further comprising the steps of:
   providing a portion of said face of said at least one utility meter comprising at least utility usage data and identifying data of said at least one utility meter of said at least one consumer; and
   displaying said utility usage data and said identifying data of said at least one utility meter on a screen of a monitor of said at least one consumer and on a screen of a monitor of said at least one utility provider.

18. The method according to claim 11, further comprising the step of:
   determining excessive utility usage by said at least one consumer by monitoring said face of said at least one utility meter of said at least one consumer over said secure network hub to reduce wasteful utility usage by said at least one consumer, conserve utility usage and reduce costs of said at least one consumer.

19. The method according to claim 11, further comprising the steps of:
   monitoring said face of said at least one utility meter of each of said at least one consumer over said secure network hub by said at least one utility provider;
   predicting future utility usage of each of said at least one consumer by said at least one utility provider to improve planning for utility expansion and planning to allocate costs of peak usage times of said utility usage of each of said at least one consumer efficiently.

20. A wireless meter-reading system having at least one consumer site and at least one utility provider site, comprising, in combination:
   (a) at least one utility meter having a housing and a face;
   (b) at least one recording device coupled to said housing, said at least one recording device adapted to read and convert data located on a portion of said face to wirelessly transmittable data, said at least one recoding device capturing visual images of the data located on a portion of said face;

(c) a power source coupled to the recording device for powering said at least one recording device; and (d) a communication device for wirelessly receiving and transmitting data between said at least one consumer site and said at least one utility provider site to facilitate instantaneous and continuous monitoring of said face of said at least one utility meter by said at least one consumer site and by said at least one utility provider site, said communication device relaying the visual images of said face of said at least one utility meter from said at least one recording device to said at least one consumer site, and said secured network hub facilitating data transmission between said at least one utility provider site and said at least one consumer site, wherein said data transmission including a billing statement and visual images confirming said billing statement.

* * * * *